United States Patent [19]

Needham

[11] 3,846,360

[45] Nov. 5, 1974

[54] BASE FOR UNIVERSAL PIGMENT CONCENTRATES

[75] Inventor: Donald G. Needham, Ramona, Okla.

[73] Assignee: Phillips Petroleum Company, Bartlesville, Okla.

[22] Filed: Dec. 13, 1971

[21] Appl. No.: 207,516

[52] U.S. Cl.. 260/23.7 R, 260/23.7 M, 260/30.6 R, 260/31.4 R, 260/31.8 M, 260/31.8 DR, 260/31.8 PQ, 260/32.8 A, 260/33.2 R, 260/33.6 AQ, 260/41 B, 260/41 R, 260/41 C, 260/41.5 R, 260/41.5 MP, 260/94.2 M, 260/887, 260/889
[51] Int. Cl............................. C08c 11/18, C08d 9/08
[58] Field of Search.... 260/33.6 AQ, 41.5 MP, 887, 260/94.2 M, 23.7 R, 23.7 M, 30.6 R, 31.4 R, 31.8 M, 31.8 DR, 31.8 PQ, 32.8 A, 33.2 R, 889

[56] References Cited
OTHER PUBLICATIONS

Encyclopedia of Pol. Sci. & Techn. 10, 289 (1969); 12, 286 (1970) (Interscience) (N.Y.) TP 156 P6 E6.

*Primary Examiner*—Allan Lieberman
*Assistant Examiner*—H. H. Fletcher

[57] ABSTRACT

Color concentrates wherein the carrier material comprises at least a minor amount of certain solution-polymerized hydrocarbons exhibit compatibility in a wide range of plastic materials.

5 Claims, No Drawings

BASE FOR UNIVERSAL PIGMENT CONCENTRATES

This invention relates to coloring synthetic materials. More particularly, it relates to solid-state masterbatch compositions which are useful for coloring polymeric materials and to their methods of preparation.

Solid-state masterbatch pigments have been effectively used as a means of introduction of color into plastics and other polymeric media. Generally, a solid-state masterbatch is composed of the pigment uniformly distributed throughout a plastic or polymeric material at a pigment concentration higher than is desired in the finished product to be colored by the masterbatch. Other materials may also be present in the masterbatch, for example, dispersing aids, polymerization promoters or inhibitors, ultraviolet light absorbers, etc. The concentrated masterbatch is added to colored or uncolored plastic or polymeric material at a level which will result in the desired shade in the finished product. The masterbatch, therefore, must be able to be readily distributed uniformly throughout the plastic media in order to be of value. If a solid-state masterbatch is used to color a plastic or polymeric liquid or solution, the polymeric moiety of the masterbatch must dissolve readily into the mass to be colored, thus releasing the pigment to be uniformly distributed throughout the mass. If the solid-state masterbatch is to color dry plastic or other polymeric materials, it must melt or otherwise lend itself to easy distribution uniformly throughout the material to be colored. An example of this would be the addition of a colored vinyl solid-state masterbatch to a clear solid-state vinyl which is then extruded wherein the masterbatch melts during extrusion and uniformly colors the mass. In those instances wherein the polymeric carrier of the concentrate is of the same composition as the polymer to be colored, many of the prior art concentrates have been quite satisfactory. However, such materials have not been suitable as universal concentrates since they have not overcome the problem of material incompatibility in those cases wherein the polymeric carrier of the concentrate comprises a different material than the polymer into which the concentrate is being incorporated.

In accordance with the present invention, there are provided pigment concentrates which lend themselves to easy distribution uniformly throughout the material to be colored and which can be let down into a wide variety of plastic materials. The concentrates of the present invention comprise distinct pigment particles dispersed in a carrier material, which carrier material comprises certain hereinafter described solution-polymerized hydrocarbons and an extender material. Preferentially, the carrier material includes a binder material. The compositions of the invention are particularly useful as universal pigment concentrates which can be let down into such polymeric materials as polyolefins, ethylene-vinyl acetate copolymers, acrylonitrile-butadiene-styrene terpolymers, polystyrene, polyamides, polyesters and the like. With the high pigment loadings possible with the compositions of this invention, smaller quantities of the concentrate can be used and incompatibility or danger of property deterioration due to the introduction of a different resin is minimized.

As pigments which can be incorporated into the color concentrates of the present invention there can be used the known inorganic and organic pigments such as carbon black, metal powder, titanium dioxide, iron, cadmium, chromium and zinc pigments, ferric hydrates, ultramarine blue, and other oxidic or sulfidic inorganic pigments as well as organic pigments such as azo-pigments, water-insoluble vat dyes, phthalocyanine, bisoxazine, quinacridone and perylenetetracarboxylic acid dyestuffs which are known, for example, from U.S. Pat. Nos. 2,844,484; 2,844,581; and 2,844,485. The term azo pigments includes azo dyestuffs which are obtained by coupling the diazo or tetraazo compounds of amines free from groups rendering solubility in water with coupling components generally used in pigment chemistry. As coupling components there may be mentioned by way of example naphthols, oxynaphthoic acid arylides, pyrazolones, acetoacetic acid arylides and the like. When these dyestuffs contain sulfonic acid or carboxylic acid groups, they may be used in the form of the color lakes prepared with salts of alkaline-earth metals.

The carrier vehicle which must be used in the practice of the invention comprises at least a minor amount of a solution-polymerized hydrocarbon elastomer. Such elastomers can be broadly defined as solution-polymerized elastomers obtained by the polymerization of conjugated dienes containing from four to 12, preferably four to eight, carbon atoms per molecule in the presence of a suitable solvent, which is a solvent for the polymer product, and an alkali metal-based polymerization initiator including (1) an Alfin catalyst, (2) an organolithium compound, or (3) an alkali metal. Examples of monomers that can be used in the preparation of the polymers include 1,3-butadiene; isoprene; piperylene; 2,3-dimethyl-1,3-butadiene; 1,3-octadiene; 4,5-diethyl-1,3-octadiene; and the like. These conjugated dienes can be polymerized to form homopolymers or mixtures of the dienes can be polymerized to form copolymers. The conjugated diene polymers can also be obtained by polymerizing at least one of the dienes with one or more copolymerizable monovinylidene containing monomers containing from three-18 carbon atoms including monovinylidene-containing aromatic compounds, such as vinylmethylene, styrene, 2-methylstyrene, or the like. The solution polymers which are suitable in the practice of the invention can be prepared by known methods using any of the mentioned catalyst systems. Representative of such processes are those disclosed in U.S. Pat. Nos. 2,975,160; 3,287,333; 3,324,099, etc. which disclose solution polymerization processes using organolithium catalysts; U.S. Pat. No. 3,285,901 which discloses solution polymerization systems using alkali metal catalyst systems; and U.S. Pat. No. 3,067,187 which discloses solution polymerization processes using Alfin catalysts. The solution polymers obtained by organolithium compound catalytic processes are preferred with 1,3-butadiene/styrene copolymers prepared according to the procedures of U.S. Pat. No. 2,975,160 being especially preferred.

It is necessary that the polymeric carrier materials of the invention be compounded with an extender oil. As used in this application, the term "extender oil" is meant to include all of the extender materials heretofore suitable for use in extending synthetic rubbers. The extender oils which are particularly useful in the practice of the invention are thus well known and hundreds have been described in the literature. Such oils are preferably petroleum oils which have been designated naphthenic, aromatic, or paraffinic oils according to the prior usage but now are described under an ASTM classification system (ASTM D 226-63T). Representative of the known extender oils are petroleum distillates, vegetable oils such as linseed and soybean oils, esters such as butyl Cellosolve pelargonate, di-n-hexyl adipate, and trioctyl phosphate; ethers; ketones; terpenes; gum turpentines; rosin; coal tar derivatives such as liquids from distillates, including alkylnaphthalene and polynuclear aromatics, and semisolids from coal tar, including low molecular weight polymers of cumarone-indene and related resins; liquid polymers of conjugated dienes such as liquid polybutadiene and liquid polyisoprene; and clay tower polymers.

Optionally and preferentially, the carrier vehicle of the invention contains a binder material. Materials which are suitable for use as binder materials in the practice of the invention include any resinous materials which have been used in the prior art in the preparation of shaped objects. Representative of such binder materials are homopolymers and copolymers of monoolefins having from 2 to 12 carbon atoms, ethylene-vinyl acetate copolymers, acrylonitrile-butadiene-styrene terpolymers, poly(vinyl chloride) and copolymers of vinyl chloride and monomers copolymerizable therewith, polystyrene and modified polystyrene compositions, polyacrylonitrile, polyesters, polyamides, polycarbonates, and the like. It is an advantageous feature of the invention that resinous materials selected as a binder can be different from the plastic to be colored. Preferably, the selected binder material should have a higher melt index, i.e., a lower melt viscosity, at processing conditions than the resin to be colored.

In forming the color concentrates of the present invention, the pigment content of the preparations may vary and may be adjusted to specific requirements. In general, a pigment dyestuff content as high as possible is desired. With the carrier substances used in the present invention, there can be produced preparations having a pigment content of up to about 90 percent by weight. The maximum concentration of the pigment in the preparation is dependent upon the pigment dyestuff used. In general, the pigment content of the preparation is within the range of about 20 to about 90 percent by weight, based on weight of carrier and pigment, preferably between about 40 to about 90 percent by weight and preferentially between about 60 to about 85 percent by weight. The proportion of the carrier vehicle in the preparations is consequently between about 80 to about 10 percent by weight, preferably between about 60 to about 10 percent by weight, and preferentially between about 40 to about 15 percent by weight. It is, of course, quite possible to provide for lower pigment proportions in the preparations. However, such preparations having a pigment proportion of less than about 20 percent by weight are of minor importance, since the highest possible pigment proportion is generally aspired to. Preparations with pigment proportions exceeding about 90 percent by weight are generally impractical since it is difficult to carry more than about 90 weight percent in carrier vehicles.

In forming the carrier vehicles of the present invention, the elastomer content, as well as the extender material and binder material content, of the preparations may vary and may be adjusted to the specific requirements. In general, the amount of solution-polymerized hydrocarbon is within the range of about 10 to about 60 weight percent, preferably in the range of about 15 to about 50 weight percent; and the amount of extender oil is within the range of about 20 to about 75 weight percent, preferably in the range of about 20 to about 60 weight percent. The binder content of the carrier vehicle, when present, is generally within the range of about 15 to about 70 weight percent, preferably within the range of about 30 to about 60 weight percent. As used throughout the specification and claims, the term "weight percent" in relation to the carrier vehicle is based on the total weight of the solution-polymerized hydrocarbon, extender oil and binder present in the carrier formulations.

In forming the color concentrate of the present invention, the materials can be combined according to any of the known methods for the blending of polymeric materials and particulate matter. Preferably, the solution-polymerized elastomers are first extended by any known manner with the extender oil and the binder, when used, is added to the oil-extended rubber to obtain an essentially homogeneous carrier vehicles. The pigments, generally in dry form, can then be incorporated into the carrier substance using equipment normally used for such blending purposes, for example, intensive mixer extruder, continuous Farrel mixer, roller mill and the like. The pigment dyestuff, which can be used in the form of dry pieces or powder, is incorporated into the carrier substance with mixing until a homogeneous mixture is formed. Incorporation of the pigment into the carrier vehicle will generally be carried out at temperatures in the range of about 250° to about 400° C., however, it is possible to work at higher temperatures provided that the quality of the product is not adversely affected thereby. In general, however, the incorporation of the pigment into the carrier vehicle is performed at a temperature as low as possible. It is a particular advantage of the pigment concentration of the present invention that the pigments can be incorporated readily into the carrier material without any difficulty at a relatively low temperature and short mixing time. Generally, the duration of mixing is in the range of about 1 to about 15 minutes and preferably in the range of about 3 to about 5 minutes.

After cooling, the concentrate can be easily comminuted, if desired, to obtain pieces ready for use, such as granules of any size. In this form the pigment concentrates can be incorporated in the plastic masses to be colored. The granular form involves the technical advantages desired in practice, i.e., the products do not dust, they can be easily dosed, have a high content of pigment and tint the plastic masses in a uniform manner with full utilization of the coloring strength and good dispersion of the pigments.

The color concentrates of the present invention are particularly suitable for coloring plastic masses of different kinds such as, for example, hard and soft poly(vinyl chloride), high and low pressure polyolefins such as high and low density polyethylene, polypropylene, polystyrene, polyvinyl acetate, natural and synthetic rubbers, polycarbonates, polyesters, polyamides and the like as well as blends thereof.

The following examples are illustrative of the invention.

EXAMPLE I

A color concentrate was prepared by successively adding into a Banbury mixer at 120 rpm at a temperature of 300°F. 25 parts by weight of a butadiene-styrene copolymer obtained by the solution-polymerization of 1,3-butadiene and styrene in the presence of an inert solvent for the copolymer and an organolithium catalyst, 25 parts by weight of Sunthene 380 naphthenic softening oil and 50 parts by weight of a polyethylene having a density of 0.917 and a melt index of 7.1, together with sufficient titanium dioxide to provide a concentrate comprising 80 weight percent pigment and 20 weight percent carrier vehicle. The mixing time was on the order of 3 minutes. After cooling, the mass was coarsely comminuted in a granulator. A granular substance was thus obtained which was well suited for coloring natural and synthetic rubbers, high and low-pressure polyethylene, polypropylene, polystyrene and poly(vinyl chloride).

EXAMPLE II

Following the procedure of Example I, a blend of a butadiene-styrene copolymer obtained by the solution-polymerization of 1,3-butadiene and styrene in the presence of an inert solvent for the copolymer and an organolithium catalyst, Sunthene 380 naphthenic softening oil and titanium dioxide was prepared to provide a color concentrate comprising 80 weight percent pigment and 20 weight percent carrier material comprising 30 weight percent extender (softening) oil and 70 weight butadiene-styrene copolymer. The pigment was poorly dispersed in the carrier material. This example demonstrates that the amount of elastomer present in the carrier vehicle is important to obtaining acceptable color concentrates.

EXAMPLE III

Following the procedure of Example II, except that the carrier material comprised equal weight percents of the same solution-polymerized butadiene-styrene copolymer and softening oil used in Example II, a color concentrate was prepared comprising 80 weight percent pigment and 20 weight percent carrier material. The dispersion of the pigment in the carrier vehicle was much improved over that obtained in Example II, and the concentrate was suitable for use in coloring plastic materials.

EXAMPLE IV

Following the procedure of Example II, except that the carrier material comprised 37 weight percent and 63 weight percent, respectively, of the same solution-polymerized butadiene-styrene copolymer and softening oil used in Example II, a color concentrate was prepared comprising 80 weight percent pigment and 20 weight percent carrier material. The dispersion of the pigment in the carrier vehicle was significantly improved over that obtained in Example II, and the concentrate was suitable for use in coloring plastic materials.

EXAMPLE V

Following the procedure of Example II, a blend of the same solution-polymerized butadiene-styrene copolymer of Example II, polyethylene having a density of 0.916 and a melt index of 20, and titanium dioxide was prepared to provide a color concentrate comprising 80 weight percent pigment and 20 weight percent of carrier material comprising equal weight amounts of butadiene-styrene copolymer and polyethylene binder. A poor pigment dispersion unsuitable for use as a color concentrate was obtained. This example demonstrates the necessity of including an extender oil in the carrier formulations of the invention.

EXAMPLE VI

Following the procedure of Example V, except that the carrier material comprised 25 weight percent of the same solution-polymerized butadiene-styrene copolymer employed in Example V, 25 weight percent of Sunthene 380 naphthenic softening oil and 50 weight percent of polyethylene having a density of 0.916 and a melt index of 20, a color concentrate was prepared comprising 80 weight percent pigment and 20 weight percent carrier material. An excellent dispersion of pigment in carrier vehicle was obtained and the resulting blend was very suitable for use as a color concentrate.

EXAMPLE VII

Following the procedure of Example VI, except that the polyethylene binder material had a density of 0.917 and a melt index of 7.1, there was prepared a color concentrate comprising 80 weight percent pigment and 20 weight percent carrier material. Again, the pigment dispersion was excellent and the resulting blend was very suitable for use as a color concentrate.

Reasonable variations and modifications are possible within the scope of the foregoing disclosure and the appended claims to the invention.

I claim:

1. A universal pigment concentrate for coloring a polymeric material selected from the group consisting of polyolefins, ethylene-vinyl acetate copolymers, acrylonitrile-butadiene-styrene terpolymers, polystyrene, polyamides and polyesters consisting essentially of:

distinct particles homogeneously dispersed in a carrier material, said carrier material consisting essentially of from about 10 to about 60 weight percent, based on weight of carrier material, of at least one first polymeric material selected from the grooup consisting of copolymers of at least one conjugated diene having from 4 to 12 carbon atoms and at least one monovinyl aromatic hydrocarbon having from 8 to 18 carbon atoms; said copolymer having been obtained by the polymerization of one or more of such monomers in the presence of an inert solvent for such copolymer and a polymerization initiator selected from the group consisting of an Alfin catalyst, an alkali metal and an organolithium compound;

from about 20 to about 75 weight percent, based on weight of carrier material of at least one extender oil; and, from about 15 to about 70 weight percent of polyethylene as a binder material wherein the amount of said pigment particles is in the range of about 20 to about 90 weight percent, based on weight of pigment and carrier material, and the amount of said carrier material is in the range of about 80 to 10 weight percent, based on weight of pigment and carrier material.

2. A concentrate according to claim 1 wherein the amount of said first polymeric material is in the range of about 15 to 50 weight percent, the amount of said extender oil is in the range of about 20 to about 60 weight percent, and the amount of said binder material is in the range of about 30 to about 60 weight percent.

3. A concentrate according to claim 2 wherein the amount of said first polymeric material is about 25 weight percent, the amount of said extender oil is about 25 weight percent and the amount of said binder material is about 50 weight percent.

4. A concentrate according to claim 3 wherein said first polymeric material is a copolymer of butadiene and styrene.

5. A concentrate according to claim 4 wherein the amount of said pigment is 80 weight percent and the amount of said carrier material is 20 weight percent.

* * * * *

UNITED STATES PATENT OFFICE

CERTIFICATE OF CORRECTION

Patent No. 3,846,360  Donald G. Needham  Dated: November 5, 1974

It is certified that error appears in the above-identified patent and that said Letters Patent are hereby corrected as shown below:

Column 6, line 38, after the word "distinct" should be inserted --- pigment ---.

Signed and sealed this 21st day of January 1975.

(SEAL)
Attest:

McCOY M. GIBSON JR.
Attesting Officer

C. MARSHALL DANN
Commissioner of Patents